United States Patent [19]

Summers

[11] 4,234,413
[45] Nov. 18, 1980

[54] METHOD AND APPARATUS FOR SELF-CLEANING DRILLING MUD SEPARATION SYSTEM

[76] Inventor: Don D. Summers, P.O. Box 30179, Lafayette, La. 70503

[21] Appl. No.: 8,751

[22] Filed: Feb. 1, 1979

Related U.S. Application Data

[63] Continuation-in-part of Ser. No. 863,475, Dec. 23, 1977, Pat. No. 4,152,253.

[51] Int. Cl.³ ............................................. B03B 7/00
[52] U.S. Cl. ..................................... 209/17; 209/326; 209/389
[58] Field of Search ................. 209/17, 315, 319, 323, 209/324–326, 385, 387, 389, 403, 405, 332, 379, 382; 210/353, 332, 413, DIG. 18; 55/295, 296, 299; 15/256.5

[56] References Cited

U.S. PATENT DOCUMENTS

| | | | |
|---|---|---|---|
| 2,773,599 | 12/1956 | Litus et al. | 209/386 |
| 3,841,482 | 10/1974 | Barrows et al. | 209/382 X |
| 3,863,765 | 2/1975 | Gray | 209/389 X |
| 3,899,414 | 8/1975 | Hansen | 209/17 |

FOREIGN PATENT DOCUMENTS 374528  4/1923  Fed. Rep. of Germany ........... 209/390

Primary Examiner—Ralph J. Hill
Attorney, Agent, or Firm—Guy E. Matthews

[57] ABSTRACT

A vibratory separator for separating drill solids from drilling mud after return from the well bore, including a separator screen and a screen cleaning device positioned adjacent the screen. The screen cleaning device is supported by suitable means to permit filtered mud to pass freely through the device for collection below. The screen is a fine wire mesh mounted in a unique manner to the separator housing such that it vibrates during operation of the system to keep drilling solids from clogging the wire mesh and restricting the flow of drilling mud. The screen cleaning device serves to support the screen and mud thereon in addition to vibrating and wiping the screen as the device rotates due to the orbital oscillatory vibrations of the system.

3 Claims, 6 Drawing Figures

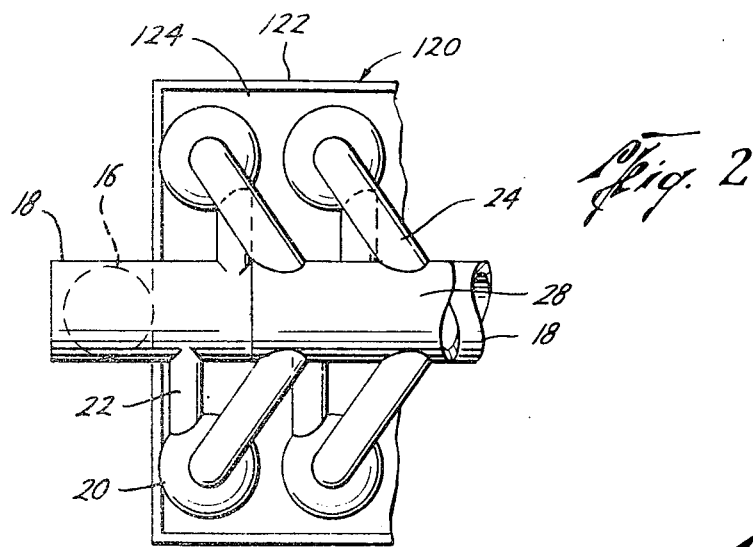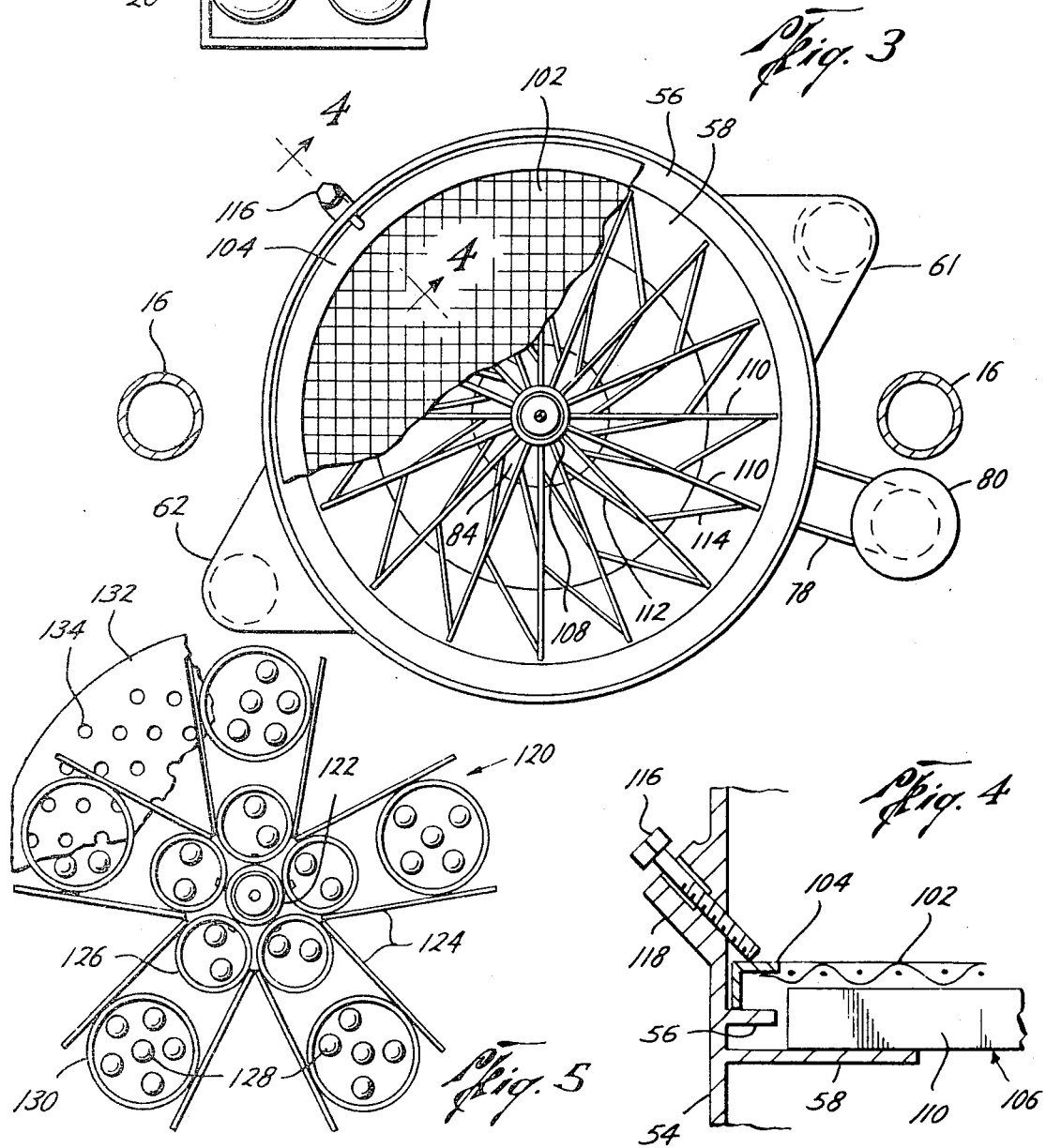

METHOD AND APPARATUS FOR SELF-CLEANING DRILLING MUD SEPARATION SYSTEM

CROSS REFERENCE TO RELATED APPLICATIONS

This application is a continuation-in-part of application Ser. No. 863,475, filed on Dec. 23, 1977, now U.S. Pat. No. 4,152,253 May 1, 1979.

FIELD OF THE INVENTION

This invention relates generally to vibratory separator mechanisms that are used for separating or filtering solid materials contained in a liquid as this combination passes through a screen assembly. More specifically, the present invention relates to the utilization of a screen cleaning device positioned adjacent a fine wire mesh separator screen with means for rotating the device in such a manner as to wipe and vibrate solids from the screen in areas where the mesh openings have been blocked or clogged by fine drilling solids. Such clogging eventually causes the screen to be replaced. As set forth hereinbelow, there is provided a unique way to remove and replace the screen; however the present invention also effectively extends the life of such screens for use with the system.

Vibratory solid/liquid separating mechanisms utilizing various screen cleaning devices are well known in the art. Typically, Brandt U.S. Pat. No. 3,960,731, Hansen U.S. Pat. No. 3,899,414, Barrows and Hansen U.S. Pat. No. 3,841,482, Swallow U.S. Pat. No. Re. 26,736, Kahane U.S. Pat. No. 3,508,649, and Gray U.S. Pat. No. 3,863,765 teach a vibratory screen separation unit utilizing a plurality of individual screen cleaning devices either above or below the separator screen. The Kahane, Hansen, Swallow and Barrows patents incorporate a plurality of screen cleaning devices positioned between the separator screen and the lower support screen, said screen cleaning devices being of a substantially tubular configuration and having rather sharp circular edges. The resulting effect of this particular design was that, due to the lateral, vertical and rotational movement of said screen cleaning devices, the exposed sharp circular edges damaged and caused excessive wear to the underside of the separator screen, thereby considerably diminishing its commercial life. This effect was substantially reduced by a screen cleaning device as taught by Brandt, however.

In addition to the problem of uneven wear on the separator screen caused by the random movement of a plurality of screen cleaning devices, another problem remained. The orbital oscillatory vibration of separator units of this type had the effect of the plurality of screen cleaning devices tending to collect at the outer edge of the separator screen, thereby decreasing the commercial effectiveness of the separator screen. If a sufficient number of screen cleaning devices to fill the entire cleaning surface area were used, the random movement would be severly restricted resulting in a substantial reduction of the effective operation of the screen cleaning devices, consequently reducing the overall effectiveness of the mud separation system.

SUMMARY OF THE INVENTION

The present invention is directed to a self-cleaning screen assembly and method of removing and replacing same as is used in an oscillatory vibration separator system for separating drill solids from drilling muds and fluids. Typically, the screen assembly is comprised of three parts:

(1) a fine wire mesh separator screen;
(2) a screen cleaning device having radially extending arms mounted adjacent the screen; and
(3) a support means for the screen cleaning device.

The separator screen normally comprises a fine wire mesh suitable for allowing free flow of the drilling muds and fluid therethrough, but preventing the passage of fine drill solids. This screen wire is pre-tensioned on a frame for easy removal and replacement at its periphery inside the separator vessel as set forth hereinbelow.

The screen cleaning device includes in the preferred embodiment radially extending arms with suitable structural support members positioned adjacent the screen. The arms and support members form a horizontally positioned plane which provides support for the separator screen. During operation, the screen cleaning device vibrates in a generally orbital pattern such that it shakes loose drill solids that have become lodged in and clog the screen and the device also rotates about its center with the purpose and effect of uniformly wiping and cleaning the under side of the screen where the occasionally stringy and silty drilling mud accumulates and blocks the flow of mud through the system.

The screen cleaning device may, in another embodiment, include a plurality of radially extending arms, a plurality of balls, or other means positioned within said arms for bouncing, contacting or vibrating the screen independently of the arms and means for maintaining the independent vibratory means in a predetermined area relative to the screen.

Still another embodiment of the screen cleaning device comprises: (1) a central member adapted to be formed into a circular band configuration, and having a plurality of slots therein, and (2) a plurality of elongated screen cleaning members, each loosely inserted into a central member slot and extending radially therefrom.

The support means may comprise a plate of general size and configuration as the screen cleaning device, including holes to allow the drill mud to freely pass therethrough, or it may be a combination of a small central support member and a peripheral member positioned in any manner suitable to support the screen cleaning device and to indirectly support the separator screen.

It is therefore a primary objective of the present invention to provide a screen cleaning device for use on self-cleaning screen assemblies on vibratory mechanical separators wherein the said screen cleaning device provides a contact over the entire area of the separator screen.

It is a further objective of the present invention to provide a screen cleaning device that is constrained to a non-random pattern of movement such that the result will be a reduced rate of screen wear uniformly over the entire contact surface.

It is a further objective of this invention to provide a screen cleaning device that will lend even support to the separator screen over its entire surface area.

It is a further objective of this invention to provide a novel means whereby the separator screen may be quickly and easily removed and replaced.

BRIEF DESCRIPTION OF THE DRAWINGS

Other objects and advantages of the invention will become apparent upon reading the following detailed description and upon reference to the drawing, in which:

FIG. 2 is a partial top view of the inlet and exit manifold and hydrocyclone assembly.

FIG. 3 is a top view of the vibratory separator vessel showing the wire mesh separator screen having a portion thereof removed for clarity to show the screen cleaning device.

FIG. 4 is a cross-sectional view taken along lines 4—4 of FIG. 3 and showing the means whereby the screen cleaning device is supported at its periphery and the wire mesh separator screen is secured at its periphery to the vertical wall of the separator vessel.

FIG. 5 is an alternative embodiment of the screen cleaning device of the present invention.

DESCRIPTION OF THE PREFERRED EMBODIMENT

Figure 1:
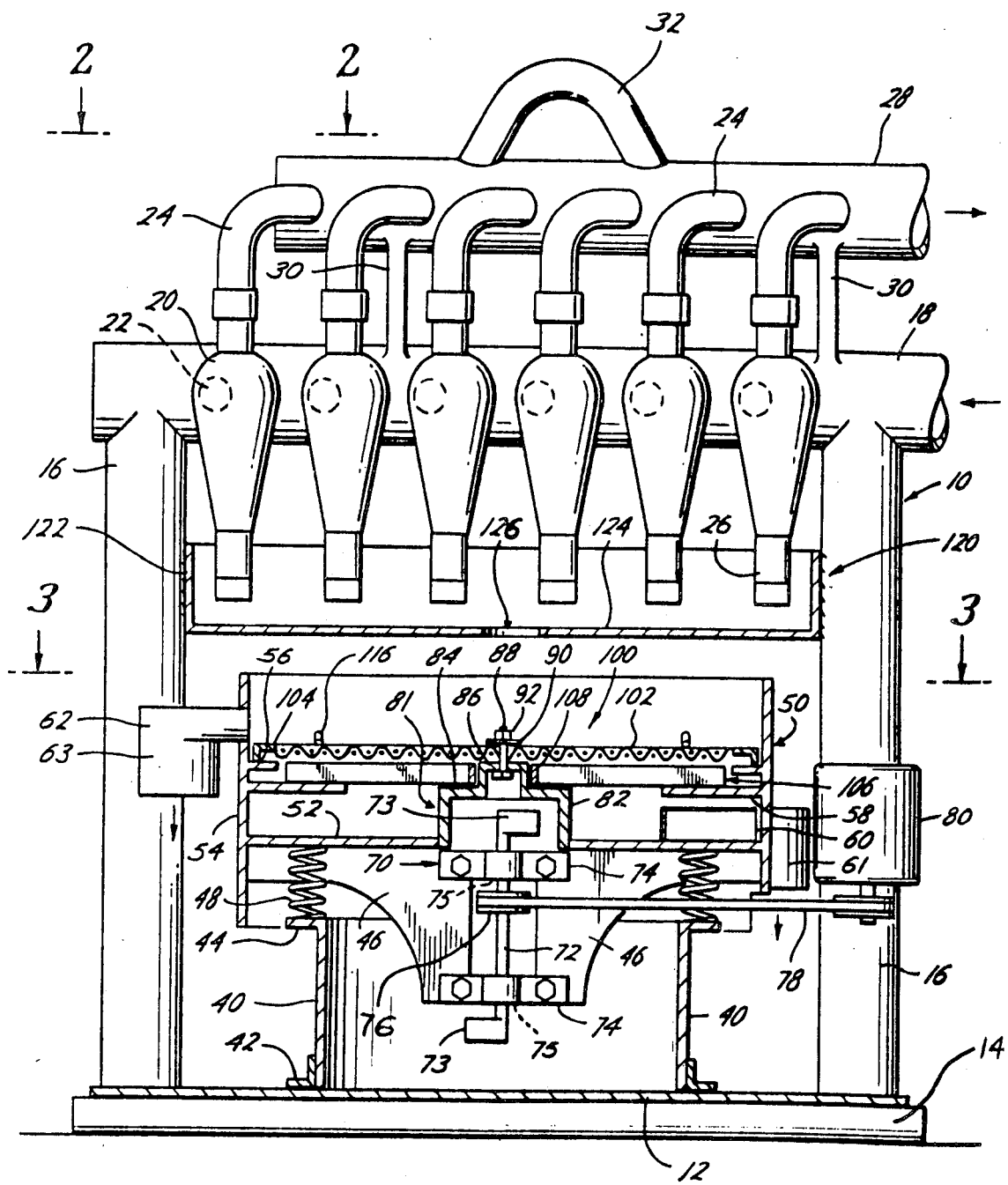
FIG. 1 is a vertical cross section through the vibratory separator in accordance with the preferred embodiment of the invention.

Referring to FIG. 1, the vibratory separator includes a frame generally illustrated at 10 comprising a floor 12 of sheet metal or similar material, a floor under pinning 14 of angle iron, pipe or a similar material affixed to the floor 12 by welds, bolts, or in any suitable manner, vertical support columns 16 positioned on the upper surface of the floor 12 and centered along opposite edges of floor 12 and affixed thereto by welding or any other suitable means, the vertical support columns 16 supporting an influent manifold 18 welded, bolted or otherwise suitably affixed thereto in a structurally suitable manner such that the influent manifold 18 defines a line connecting the upper surfaces of the vertical support columns 16, a plurality of hydrocyclones positioned vertically and along either side of the influent manifold 18 and connected thereto by a plurality of inlet pipes 22 which supply drilling mud to be cleaned to the plurality of hydrocyclones 20 from the influent manifold 18. An exit manifold 28 is positioned immediately above and parallel to the influent manifold 18 and is mounted thereto by a plurality of braces 30 welded at each end to the influent manifold 18 and the exit manifold 28, respectively. The plurality of hydrocyclones 20 is also connected to the exit manifold 28 by a plurality of upper exhaust pipes 24 which return clean drilling mud to the exit manifold 28 and then to the suction tank. Also affixed to the exit manifold 28 by welding or other suitable means is an eyelet 32 by which the entire vibratory separator may be hooked and transported by the use of a crane or similar device.

The vibratory separator unit sits on the floor 12 and is positioned between the vertical support columns 16. The unit includes a stationary cylindrical base 40 rigidly mounted to the floor 12 by means of an annular angle iron ring 42 affixed to the stationary base 40 and the floor 12 by welds, bolts or some other suitable method. The stationary base 40 includes an upper support lip or angular ring 44 to which the separator vessel 50 is resiliently mounted by a plurality of springs 48. The separator vessel 50 includes a horizontal floor 52, a cylindrical side wall 54, a means 56 for supporting a separator screen 102, a means 58 for supporting a screen cleaning device 106, a lower exit opening 60 through which filtered drilling mud passes and an upper exit opening 62 through which solid drill material passes. The support members 56 and 58 comprise angular rings mounted inside the separator vessel 50 and welded to the inside of the vertical side wall 54, as shown in FIG. 1. The separator vessel floor 52 also comprises an annular ring somewhat larger than members 56 and 58, said floor being welded to the inner side wall 54. Welded to the inner diameter of the separator vessel floor 52 is a vibration housing generally illustrated at 81 consisting of a vertically positioned cylindrical wall 82 above which and welded thereto is a circular, horizontal support plate 84. Disposed within the separator vessel 50 and directly below the vessel floor 52 is a plurality of support gussets 46 welded to the inside of the vessel side wall 54 and to the under side of the vessel floor 52 in a manner suitable to add support and rigidity to the separator vessel 50. As shown in FIG. 1, two of the support gussets 46, which are diagonally opposite each other, also serve as a mounting surface for the vibration means generally illustrated at 70. The vibration means 70 includes a vertical shaft 72 positioned in the center of the cylindrical members of the separation unit, and is mounted to the two aforementioned gussets 46 by means of a plurality of bearing mounts 74 which house a plurality of rotary bearings 75. A pulley 76 is mounted along the longitudinal center of the shaft 72 which is driven by a belt 78, which in turn is driven by an electric motor 80. At each end of the rotating shaft 72 are mounted eccentric weights 73 which induce an orbital oscillatory vibration to the system when the shaft 72 is rotated at high speed.

Mounted within the separator vessel 50 and resting on the screen support 56, screen cleaning device support ring 58 and the horizontal support plate member 84 is a self-cleaning screen assembly generally illustrated at 100. The self-cleaning screen assembly comprises a separator screen 102 mounted on an annular angle iron frame 104, a screen cleaning device generally illustrated at 106, comprising a central cylindrical member 108, a plurality of radially extending arms 110, and plurality of inner support arms 112 and outer support arms 114 mounted between the radial arms 110 (FIG. 3). The screen cleaning device 106 may be constructed of any suitable material such as molded plastic, P-V-C or polyurethane, plastic, P-V-C or polyurethane strips permanently bonded together, brazed aluminum strips, or any other suitable material. As shown in FIG. 3, the screen cleaning device 106 is of a similar configuration to the separator screen 102. The radially extending arms 110 are connected at one end to the central cylindrical member 108 and are interconnected in a structurally suitable manner by the inner support arms 112 and outer support arms 114 such that the effect of the screen cleaning device 106 rotating about its central member 108 is that a given area of the separator screen 103 is wiped on the underside and cleaned by the outwardly extending raidal arm 110 and is also wiped and cleaned a second time by the innerconnecting structural members 112 and 114 as the screen cleaning device 106 vibrates vertically and rotates relative to the separator screen 102.

The screen cleaning device 106 is supported at its center by the horizontal support plate 84 and at its periphery by the screen cleaning device support ring 58. The screen cleaning device 106 rests on the horizontal support plate 84 and is centered on the central pivot member 86 of the horizontal support plate 84 as shown in FIG. 1. The separator screen 102 rests at its periphery on the screen support ring 56 and at its center on the upper horizontal surface of the center pivot member 86. The separator screen 102 is rigidly attached to the vibration housing 81 at the central pivot member 86 and is held in place by a stud 88 extending from the central pivot member 86, a flat washer 90 and nut 92. As shown in FIGS. 3 and 4, the separator screen 102 is rigidly mounted at its periphery to the inner side wall 54 of the separator vessel 50 by means of a plurality of pinning members 116 passing through the inner side wall 154 at the boss 118. As may readily be seen from FIG. 4, the separator screen 102 may be easily and quickly removed and replaced by retracting the pinning members 116 sufficiently and removing the nut 92 and washer 90 at the center of separator screen 102.

As may be seen from FIG. 1, the top surfaces of the horizontal support plate 84 and the screen cleaning device support ring 58 define a horizontal plate below and parallel to the plane defined by the separator screen 102. As shown in FIG. 1, the space between the two aforementioned parallel planes is defined by the height of the central pivot member 86 of the vibration housing 81 and also defined by the spacing between the upper surfaces of the screen support ring 56 and the screen cleaning device support ring 58. As will be explained later, this space between the aforementioned parallel planes is slightly larger than the height of the screen cleaning device 106 in order that the screen cleaning device 106 may vibrate vertically within the area defined by the two aforementioned planes.

Referring back to FIG. 1, a collection trough, generally illustrated at 120 is shown mounted to the vertical support columns 16 by welding, bolting, or some other suitable means. The collection trough 120 comprises side walls 122, a floor 124 having a centrally located exit orifice 126 for collecting drilling mud as it exits the plurality of hydrocyclone exhaust ports 26 and directing it onto the central area of the separator screen 102. It will be noted that the collection trough 120 is positioned only a few inches below the hydrocyclone exhaust ports 26 in order to minimize splash-over occasioned by the drilling mud and drill solids exiting the lower exhaust ports 26 under slight pressure. The collection trough 120 is positioned far enough above the separation vessel 50 to provide the operator easy access to the separator screen when replacement becomes necessary, as will be explained hereinafter.

In the typical operation of the drilling mud separation unit, the drilling mud to be filtered enters through the influent manifold 18, passes through the inlet pipes 22 and enters the hydrocyclones 20. As shown in FIGS. 1 and 2, the drilling mud enters the hydrocyclones 20 through the tangentally mounted inlet pipes 22, thereby imparting an angular velocity to the drilling mud. The centrifugal force created by this angular velocity causes the more dense drill solid material to migrate to the inner wall of the hydrocyclone 20, forcing the less dense material (clean drilling mud) to the center of the hydrocyclone 20 where it is pushed out the top of this hydrocyclone 20 under pressure from the influent manifold 18 and is caused to pass through the upper exhaust pipe 24, through the exit manifold 28, then returned to the suction tank. The denser material within the drilling mud (silt, sand and fine drill solids) migrates to the inner wall of the hydrocyclone 20 and down the inner wall and out the lower exhaust port 26. The heavier drilling mud containing the silt, sand and drill solids, exits the hydrocyclone at the lower exhaust port 26 and is collected in the collection trough 120 positioned directly below the hydrocyclone lower exhaust ports 26. The drilling mud to be cleaned is then directed to the center of the collection trough 120 where it passes through the centrally located exit orifice 126, and is deposited on the center of the separation secreen assembly 100.

The eccentric weights 73, mounted on the rotating shaft 72 impart an orbital oscillatory vibration to those parts of the separation unit that are rigidly attached to the vibration means 81, specifically, the separator vessel 50 and the separator screen assembly 100. This orbital oscillatory vibration causes the drilling mud deposited on the center of the separator screen 102 to be vibrated toward the periphery of the screen 102 in a generally radial arc, or spiral pattern. The drilling mud able to pass through the fine wire mesh separator screen 102 does so, passes through the screen cleaning device 106 and is collected on the floor 52 of the separator vessel 50. This clean filtered drilling mud then exits the vessel 50 via the drilling mud exit opening 60 and falls through the spout 61, where it is collected and then returned to the suction tank.

The silt, sand and fine drill solids that are unable to pass through the separator screen 102 are vibrated in a generally radial arc or spiral pattern toward the periphery of the separator screen 102. The orbital oscillatory vibration causes these particles to move along the inside vertical wall 54 of the separator vessel 50 until the particles are able to exit the separator vessel via opening 62 and pass through the spout 63.

It is typical in such drilling mud separation process for the fine drill solids to become lodged in the separator screen 102, thereby clogging the screen, impeding the flow of drilling mud therethrough and reducing the overall efficiency of the drilling mud separation system. In the particular device illustrated this problem is avoided by means of the screen cleaning device 106 positioned immediately below the separator screen 102, as shown in FIGS. 1 and 4. As shown in FIG. 1, this screen cleaning device 106 is not rigidly attached to the vibration means 81, but rather simply rests on the horizontal support plate 84 of the vibration housing 81 and is supported at its periphery by the screen cleaning device support ring 58 welded to the inner wall 54 of the separator vessel 50. The screen cleaning device 106 is constrained to a rotational movement about the center pivot member 86 of the horizontal support plate 84 and to a slight vertical vibration as defined by the space between the underside of the separator screen 102 and the horizontal plane defined by the upper surface of the horizontal support plate 84 and the upper surface of the screen cleaning device support ring 58. The orbital oscillatory vibration imparted to the screen cleaning device through its central member 108, causes the radially extending arms 110, the inner support arms 112 and the outer support arms 114, as a unit, to vibrate in a vertical pattern and also rotate about the central pivot member 86 of the vibration housing 81. This combined vertical vibration and rotating motion operate to impart a vertical vibration over the entire surface area of the separator screen 102, thus freeing any drill solids that have become lodged in the screen 102. The orbital oscillatory vibration imparted to the separator screen 102 causes these fine drill solids that have been freed by the vibration action of the screen cleaning device 106 to bounce along the upper surface of the separator screen 102 along a spiral path toward the periphery of the separator screen 102 and collect along the inside vertical wall 54 of the separator vessel 50 where such particles may be vibrated and carried along the inside wall 54 until allowed to pass through the exit opening 62 and out the spout 63.

Also typical in the drilling mud separation process is that the silty and stringy material contained in the drilling mud will tend to collect on the underside of the separator screen 102, especially under the fine drill solids that are temporarily lodged in the screen 102, thereby restricting the free flow of drilling mud through the screen 102, and hence decreasing the overall efficiency of the mud separation system. It is therefore desirable to provide a means for cleaning the underside of the separator screen 102 in a uniform manner in order to insure the efficient operation of the separation system. This is accomplished in the present instance by the radially extending arms 110 and the support arms 112 and 114 of the screen cleaning device 106 positioned directly below the separator screen 102. The orbital oscillatory vibration imparted to the separation system causes the screen cleaning device 106 to vibrate in a vertical pattern and also to rotate relative to the separator screen 102 about the central pivot member 86 of the horizontal support plate 84.

During operation, as the screen cleaning device 106 rests on the horizontal support plate 84 and the screen cleaning device support ring 58, an angular or rotational thrust is imparted to the screen cleaning device 106. This action combined with the vertical vibration of the screen cleaning device 106 causes the screen cleaning device 106 to rotate a small amount while it is momentarily suspended in the space defined by the plane of the separator screen 102 and the plane defined by the combined screen cleaning device support members 84 and 58. The screen cleaning device 106 strikes the underside of the separator screen 102 as it is momentarily rotating about the central pivot member 86 of the horizontal support plate 84. This angular or rotational thrust of the screen cleaning device 106 causes the radially extending arms 110, the inner support arms 112 and the outer support arms 114 of the screen cleaning device 106 to instantaneously wipe and clean the underside of the separator screen 102 thereby keeping the screen 102 free from any accumulation of drill solids and silt. As may be seen in FIG. 3, the effect of positioning the inner and outer support arms 112 and 114 as shown is to provide a "double action" cleaning of the underside of the separator screen 102. Typically during operation, one of the radially extending arms 110 will wipe and clean the underside of the separator screen 102, essentially along an entire radius of the separator screen 102. As the device 106 rotates, the cleaning action of a radially extending arm 110 is followed immediately by the cleaning action of the inner support arm 112 and the outer support arm 114, essentially along the same radius as defined by the radially extending arm 110. As the screen cleaning device 106 rotates about the central pivot member 86, this procedure is repeated for each of the radially extending arms 110 and corresponding sets of inner support arms 112 and outer support arms 114, such that the effect is to continuously and uniformally wipe and clean the underside of the separator screen 102.

It is also typical in the drilling mud separation operation for larger drill solid material to be included in the drilling mud to be filtered. The presence of these larger solid pieces on the separator screen 102 has the unfortunate effect of damaging the separator screen 102 if this screen is not supported below in some manner. It is an additional feature of the preferred embodiment of the screen cleaning device 106 to provide uniform support over the entire surface area of the separator screen 102 in order to minimize the uneven wear to the screen 102 occasioned by the presence of these larger drill solids contained in the drilling mud to be filtered.

As shown in FIG. 4, means are provided to secure the separator screen 102 at its periphery to the inner vertical wall 54 of the separator vessel 50. The angle iron frame 42 of the separator screen 102, may be tightly secured to the screen support ring 56 of the vessel 50, by means of a screw, bolt or similar device 116. As shown also in FIG. 1, the separator screen 102 may be secured at its center to the vibration means 81 by using a flat washer 90 and a nut 92 or similar device. This allows the operator to quickly and easily remove and replace the separator screen 102 in a matter of minutes without moving the vibratory separator unit or any part thereof.

Figure 6:
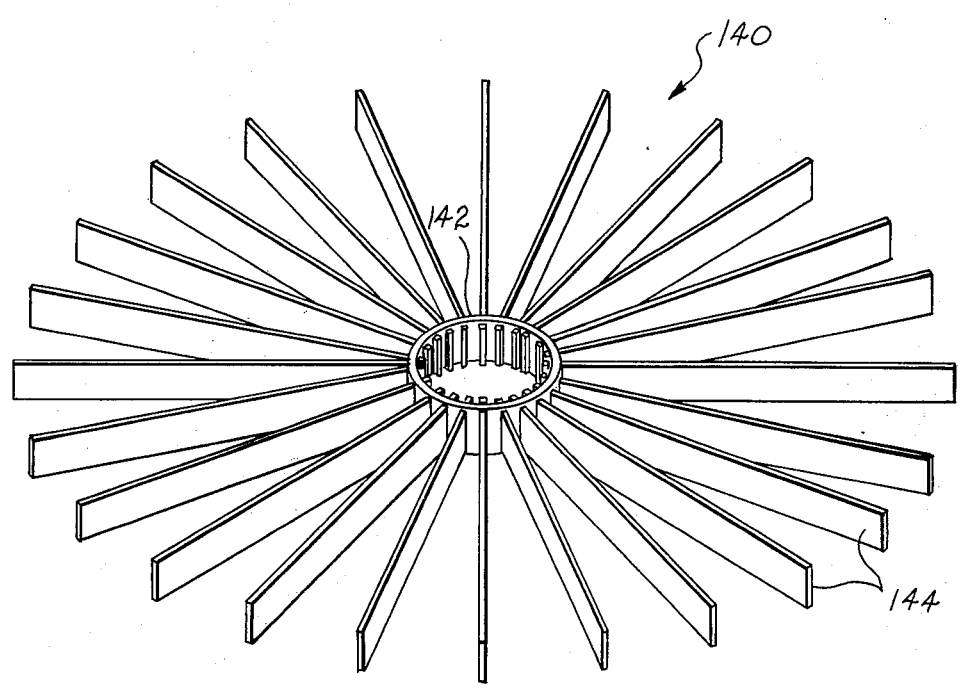
FIG. 6 is another alternative embodiment of the screen cleaning device of the present invention.

As illustrated in FIG. 6, an alternative embodiment of the screen cleaning device is shown generally at 140. This alternative embodiment comprises a (1) a central member adapted to be formed into a circular band configuration, and having a plurality of slots therein, and (2) a plurality of elongated screen cleaning members, each loosely inserted into a slot in the central member and extending radially outwardly therefrom when the the central member 142 is formed in its circular band configuration. Each elongated screen cleaning member 144 is loosely inserted into a central member slot such that it has a certain amount of freedom of movement. As in the preferred embodiment, the central member 142 and elongated screen cleaning members 144, when combined, are of a similar configuration in that their upper and lower surfaces define horizontal planes below and parallel to the plane defined by the separator screen 102, in order that this alternative embodiment 140 is readily interchangeable with the preferred embodiment of the screen cleaning device 106.

This assembible alternative embodiment of the screen cleaning device 140 may be readily assembled by, first, forming the central member 142 into a continuous circular band and connecting the ends thereof together, and second, inserting each elongated screen cleaning member 144 into a central member slot from an angle of approximately 45° from vertical so that the elongated screen cleaning member may lock itself into position in the slot when lowered into horizontal position. When so positioned, the elongated screen cleaning members 144 extend radially outwardly from the central member 142 and the device 140 as a unit may now be positioned within the separator vessel 50 about the central pivot member 86 and upon the horizontal support plane 84 in a manner identical to that of the perferred embodiment 106, as shown in FIGS. 1 and 4. So positioned, the alternative device 140 will function identically to the perferred embodiment.

As illustrated in FIG. 5, a second alternative embodiment of the screen cleaning device is shown generally at 120. This second alternative embodiment comprises a central cylindrical member 122, a plurality of pairs of outwardly extending arms 124, each pair of arms being tangentially affixed to a plurality of individual grouping and retaining rings 126 for retaining a plurality of independent vibratory devices 128, such as neoprene balls.

As shown in the figure, the unitary device 120 is of a similar configuration to the separator screen 102 and the preferred embodiment of the screen cleaning device 106. As shown in FIG. 5, the innermost set of grouping and retaining rings 126 are connected to each other, and are connected to the central cylindrical member with a pair of outwardly extending arms 124 tangentially mounted to each of the said grouping and retaining rings 126. Each of a plurality of a second set of larger grouping and retaining rings 130 are mounted between each of the plurality of pairs of outwardly extending arms 124 at a location outward from the innermost set of retaining rings 126 and are connected thereto in a structurally suitable manner to add support and rigidity to the screen cleaning device 120.

As in the preferred embodiment 106, each alternative screen cleaning device 120 and 140 may be constructed of any suitable material such as molded plastic, P-V-C, polyurethane, aluminum strips or any other suitable material. Additionally, the second alternative embodiment 120 may be constructed by permanently bonding together plastic, P-V-C, or polyurethane strips, or by brazing together aluminum strips as desired.

When the second alternative screen cleaning device 120 is used in the system, a different means of support is required, as will become apparent from the discussion that follows. An alternative screen cleaning device support plate 132 (FIG. 5) is of almost identical configuration to that of the separator screen 102. It is a circular sheet functionally replacing the horizontal support plate 84 and the screen cleaning device support ring 58 of the preferred embodiment. It forms the horizontal support member of the vibration housing 81 and, like the support ring 58, is welded to the separator vessel inner side wall 54.

The alternative screen cleaning device support plate 132 contains a plurality of small perforations 134, or holes, therein, which perforations allow the filtered drilling mud to readily flow therethrough and be collected on the vessel floor 52 for return to the suction tank.

As with the preferred screen cleaning device 106, both alternative embodiments 120 and 140 are of a height slightly less than the space between the separator screen 102 and the screen cleaning device support means, in order that the device 120 may freely rotate and vibrate vertically within the space defined by the separator screen 102 and the support means.

As an additional means of cleaning the separator screen 102, each of the plurality of grouping and retaining rings 126 and 130 contains a plurality of individual, independent vibrators 128, such as neoprene balls, or the like. These vibrators 128 are of a suitable size so as to: (1) freely vibrate within their respective grouping and retaining rings 126 and 130; (2) preclude the possibility of their passing through the perforations 134 in the screen cleaning device support plate 132; and (3) preclude their lodging themselves in the support plate perforations 134 and blocking or restricting the flow of drilling mud therethrough.

It will be apparent to those skilled in the art that the second alternative embodiment of the screen cleaning device 120 functions in a manner identical to that of the preferred embodiment 106, and that the independent vibrators 128 impart an additional vertical vibration to the separator screen 102 for dislodging any fine drill solids therefrom as the screen cleaning device 120 rotates about the central pivot member 86 of the vibration means 81.

It may further be appreciated that radial arms may not be used but other shapes or members or means for vibrating the screen including a plurality of independent means for vibrating the screen and a means for maintaining the independent means in a predetermined area. Further, it is to be understood that while the screen cleaning device has been described as being positioned under the screen, other suitable means and methods can be provided for enabling vibrating, wiping and cleaning the screen from above such screen.

Thus, it is apparent that there has been provided in accordance with the invention, a drilling mud separation unit that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as full within the spirit and scope of the appended claims.

The invention having been described, what is claimed is:

1. In a system for separating drill solids from drilling mud comprising a frame, a support base, a means for imparting vibration to said system, a separator vessel and a self cleaning screen assembly comprising separator screen and a lower support device, the improvement comprising
 an assemblible screen cleaning device for use with said screen assembly, said device comprising:
 (1) A central member having a plurality of slots therein, each for receiving an elongated screen cleaning member;
 (2) a plurality of elongated screen cleaning members, one of each of which is loosely inserted into 1 of each of said slots in said central member for enabling freedom of movement, each of said members extending radially outwardly and forming a plane with said central member; and
 (3) said screen cleaning device being positioned between said lower support device and said separator screen, for continually wiping, unclogging and cleaning said separator screen as said screen cleaning device vibrates vertically and rotates about said vibration imparting means in said plane.

2. The device as set forth in claim 1, wherein said central member comprises a thin, a flat strip of pliable material adapted to be formed into a continuous circular band by connecting the ends thereof to each other, and wherein said screen cleaning members comprise elongated flat strips of like material adapted to be inserted into said central members slots and extend radially outwardly therefrom.

3. An improved method of separating drill solids from drilling mud which comprises the steps of:
 (a) providing an assemblible screen cleaning device comprising a central member and a plurality of screen cleaning members;
 (b) forming the screen cleaning device central member into a circular band and connecting the ends thereof to each other;
 (c) inserting each screen cleaning member into a slot within the central member so that the cleaning members extend radially outward from said central member;

(d) positioning said assembled screen cleaning device directly below and parallel to a separator screen within a drilling mud separation system;

(e) supporting said assembled screen cleaning device in a suitable manner that will permit the drilling mud to freely pass therethrough;

(f) directing the mud to be filtered through an influent manifold to a plurality of hydrocyclones for the purpose of preliminary separation of the drill solids from the drilling mud;

(g) collecting the filtered drilling mud from the plurality of hydrocyclones and returning it into the drilling system;

(h) collecting the mud that requires further filtering as it exits the plurality of hydrocyclones and directing it into a vessel for separating the drill solids from the drilling mud;

(i) collecting the mud to be filtered on a fine wire mesh screen within the separator vessel that will allow the liquid to pass therethrough yet retain the fine drill solids;

(j) vibrating said screen to prevent the fine drill solids from collecting on and clogging said screen, thus impairing its efficiency;

(k) vibrating and rotating said screen cleaning device, positioned below said separator screen so as to continuously vibrate said screen and uniformly wipe the underside of said screen to maintain said screen free of fine drill solids that tend to lodge in the screen mesh and clog said screen; and (l) collecting the drilling mud as it flows through said screen and said screen cleaning device.

* * * * *